United States Patent
Choi et al.

(10) Patent No.: US 11,878,631 B2
(45) Date of Patent: Jan. 23, 2024

(54) INFOTAINMENT DEVICE, INFOTAINMENT SERVICE PROVIDING METHOD, AND VEHICULAR ELECTRONIC SYSTEM COMPRISING INFOTAINMENT DEVICE

(71) Applicant: Samsung Electronics Co., Ltd., Suwon-si (KR)

(72) Inventors: Hoon Choi, Suwon-si (KR); Nara Cho, Suwon-si (KR); Sungdae Cho, Suwon-si (KR); Sungjun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 860 days.

(21) Appl. No.: 15/733,361

(22) PCT Filed: Jan. 31, 2019

(86) PCT No.: PCT/KR2019/001331
§ 371 (c)(1),
(2) Date: Jul. 9, 2020

(87) PCT Pub. No.: WO2019/151788
PCT Pub. Date: Aug. 8, 2019

(65) Prior Publication Data
US 2021/0114531 A1    Apr. 22, 2021

(30) Foreign Application Priority Data
Feb. 5, 2018    (KR) .................. 10-2018-0014222

(51) Int. Cl.
*B60R 11/02*    (2006.01)
*B60K 37/02*    (2006.01)
(Continued)

(52) U.S. Cl.
CPC .......... *B60R 11/0205* (2013.01); *B60K 37/02* (2013.01); *B60R 11/0217* (2013.01);
(Continued)

(58) Field of Classification Search
None
See application file for complete search history.

(56) References Cited

U.S. PATENT DOCUMENTS

| 9,730,041 B2 | 8/2017 | Choi |
| 2005/0052334 A1* | 3/2005 | Ogino ................ H01Q 9/30 |
| | | 343/866 |

(Continued)

FOREIGN PATENT DOCUMENTS

| JP | 2003-332957 A | 11/2003 |
| JP | 2011-025850 A | 2/2011 |

(Continued)

OTHER PUBLICATIONS

International Search Report and Written Opinion of the International Searching Authority in connection with International Application No. PCT/KR2019/001331 dated May 15, 2019, 14 pages.

*Primary Examiner* — Frantz Bataille

(57) ABSTRACT

Disclosed is an infotainment device. The infotainment device comprises: a connector detachably attached to a slot disposed in a vehicle; at least one auxiliary antenna electrically connected to a main antenna arranged on the outside of the vehicle; a first communication circuit capable of performing communication for an infotainment service by using the main antenna and the at least one auxiliary antenna; a second communication circuit capable of performing communication with a head unit device installed in the vehicle; and a processor functionally connected to the connector, the at least one auxiliary antenna, the first communication circuitry, and the second communication circuitry, wherein the processor may be configured to: acquire (Continued)

a signal for the infotainment service by using the first communication circuit; and output the acquired signal using a speaker or a display which is functionally connected to the head unit device, through the second communication circuit; In addition, various embodiments recognized through the specification are possible.

15 Claims, 11 Drawing Sheets

(51) Int. Cl.
*H01Q 1/32* (2006.01)
*H04W 4/021* (2018.01)

(52) U.S. Cl.
CPC ......... *H01Q 1/3208* (2013.01); *H01Q 1/3275* (2013.01); *B60K 2370/164* (2019.05); *B60R 2011/0288* (2013.01); *B60R 2011/0294* (2013.01); *H04W 4/022* (2013.01)

(56) References Cited

U.S. PATENT DOCUMENTS

| | | | |
|---|---|---|---|
| 2006/0135069 A1 | 6/2006 | Bune | |
| 2014/0095000 A1* | 4/2014 | Waller | G06F 3/1454 701/1 |
| 2014/0310739 A1* | 10/2014 | Ricci | G06Q 20/321 725/75 |
| 2016/0135028 A1 | 5/2016 | Choi | |
| 2017/0141822 A1* | 5/2017 | Pham | H04B 7/0639 |

FOREIGN PATENT DOCUMENTS

| | | |
|---|---|---|
| KR | 10-2006-0069261 A | 6/2006 |
| KR | 10-0781231 B1 | 11/2007 |
| KR | 10-2009-0099951 A | 9/2009 |
| KR | 10-2010-0123435 A | 11/2010 |
| KR | 10-2014-0033984 A | 3/2014 |
| KR | 10-1601534 B1 | 3/2016 |

* cited by examiner

INFOTAINMENT DEVICE, INFOTAINMENT SERVICE PROVIDING METHOD, AND VEHICULAR ELECTRONIC SYSTEM COMPRISING INFOTAINMENT DEVICE

CROSS-REFERENCE TO RELATED APPLICATIONS

This application is a 371 National Stage of International Application No. PCT/KR2019/001331, filed Jan. 31, 2019, which claims priority to Korean Patent Application No. 10-2018-0014222, filed Feb. 5, 2018, the disclosures of which are herein incorporated by reference in their entirety.

BACKGROUND

1. Field

Embodiments disclosed in the disclosure relate to an infotainment service technology for vehicle.

2. Description of Related Art

An infotainment system for vehicle may provide vehicle state information necessary for driving and directions, digital multimedia broadcasting (DMB), navigation, or an entertainment service such as music and radio. To provide such services, the infotainment system for vehicle may receive a DMB, global positioning system (GPS) or radio signal or may perform specified wired/wireless communication with a portable device in a vehicle.

Future cars provide autonomous driving, car sharing, and entertainment as prerequisites. The importance of the infotainment system in a vehicle environment is expected to be more increased.

SUMMARY

Meanwhile, because the vehicles are expensive, have a long replacement cycle, and are composed of embedded hardware, a hardware upgrade needs professional help and is not easy. Thus, an infotainment system for vehicle may continue being used in a state where it is implemented when vehicles are produced or may be upgraded (or replaced) only after the high upgrade cost is paid. In addition, because the infotainment system for vehicle should be compatible with a network environment, it needs to be updated to use an upgraded network environment (e.g., 5G).

Various embodiments disclosed in the disclosure are to provide an infotainment device capable of easily upgrading hardware mounted on a vehicle, a method for providing an infotainment service, and an electronic system for vehicle including the infotainment device.

In accordance with an aspect of the disclosure, an infotainment device is provided. The infotainment device may include a connector detachable from a slot disposed in a vehicle; at least one sub-antenna electrically connected with a main antenna disposed outside the vehicle; a first communication circuitry configured to perform communication for an infotainment service using the main antenna and the at least one sub-antenna; a second communication circuitry configured to communicate with a head unit device installed in the vehicle; and a processor operatively connected with the connector, the at least one sub-antenna, the first communication circuitry, and the second communication circuitry. The processor may be configured to obtain a signal for the infotainment service using the first communication circuitry and output the obtained signal using a speaker or a display operatively connected to the head unit device via the second communication circuitry.

In accordance with another aspect of the disclosure, a method for providing an infotainment service is provided. The method may include being powered on using an operating system for infotainment service under an instruction of a head unit device installed in a vehicle; obtaining a signal for an infotainment service using a main antenna provided outside the vehicle and at least one sub-antenna provided internally; and outputting the obtained signal through at least one of a speaker or a display operatively connected to the head unit device.

In accordance with another aspect of the disclosure, an electronic system for vehicle is provided. The electronic system may include a slot disposed in a vehicle; a main antenna disposed outside the vehicle; and at least one sub-antenna. The electronic system may further include an infotainment device configured to be detachable from the slot; and a head unit device operatively connected with at least one of a display or a speaker. The infotainment device may be configured to obtain a signal for an infotainment service using the main antenna and the at least one sub-antenna and instruct the head unit device to output the obtained signal through at least one of the display or the speaker.

According to embodiments disclosed in the disclosure, hardware (e.g., a network environment) for an infotainment service may be easily upgraded in the vehicle. In addition, various effects ascertained directly or indirectly through the disclosure may be provided.

With regard to description of drawings, the same or similar denotations may be used for the same or similar components.

DETAILED DESCRIPTION

Figure 1:
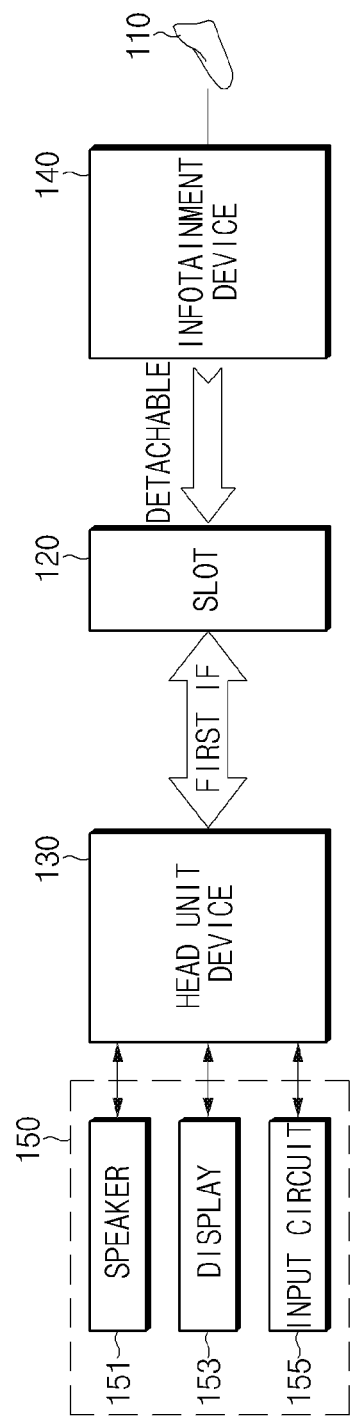
FIG. 1 is a drawing illustrating a configuration of an electronic system for vehicle according to an embodiment.

FIG. 1 is a drawing illustrating a configuration of an electronic system for vehicle according to an embodiment.

Referring to FIG. 1, according to an embodiment, the electronic system for vehicle may include a main antenna 110, an input/output device 150, a head unit device 130, a slot 120, and an infotainment device 140. In an embodiment, the electronic system for vehicle may omit some components or may further include an additional component. For example, the electronic system for vehicle may further include another antenna for obtaining a radio service or GPS signal. In an embodiment, some of the components of the electronic system for vehicle may be combined to form one entity, and functions of the corresponding components before the combination may be performed in the same manner.

According to an embodiment, the main antenna 110 may be an external antenna disposed outside a vehicle. For example, the main antenna 110 may be a shark antenna provided on a rear glass of the vehicle. The main antenna 110 may be used to obtain, for example, a DMB signal, to obtain a DMB signal and a GPS signal, or for an emergency call. The main antenna 110 may be connected with the infotainment device 140 (e.g., a sub-antenna of the infotainment device) through a transmission line 310 formed on at least one of an upper surface, a side surface, or a lower surface of a car body.

According to an embodiment, the input/output device 150 may include an input circuit 155, a speaker 151, and a display 153. The input/output device 150 may be operatively connected with the head unit device 130. At least one of the input circuit 155, the speaker 151, and the display 153 may be composed of a plurality of devices. For example, the speaker 151 may include a plurality of speakers for outputting a multi-channel signal. For another example, the display 153 may include a plurality of displays among a navigation display, a display of a dashboard, or a display of an entertainment service device. In an embodiment, the input circuit 155 may include at least one of a physical button, a touch pad, or a touch panel and may output a signal corresponding to a touch input in response to the touch (or manipulation) input of a user.

According to an embodiment, the head unit device 130 may be disposed in a dash board of the vehicle. The head unit device 130 may provide a cassette function, a CD player function, a radio function, or a navigation function using the input/output device 150. For example, when having a hardware module for the cassette, CD player, or radio function and when identifying a user input via the input circuit 155, the head unit device 130 may provide the cassette, CD player, or radio function via the speaker 151 depending on the identified user input. For another example, when having the navigation function, the head unit device 130 may obtain route guidance information using the shark antenna or another embedded GPS antenna and may provide the route guidance information (the navigation function) via the speaker 151 and the display 153.

According to an embodiment, the head unit device 130 may provide a dashboard function. For example, the head unit device 130 may output vehicle state information on the display 150 of the dashboard. The vehicle state information may include at least one of, for example, a vehicle speed, a fuel state, or a gear state.

According to an embodiment, the head unit device 130 may be powered on, when the ignition is on or when the ACC is powered on. When powered on, the head unit device 130 may be driven in a foreground state using a vehicle dedicated operating system. The vehicle dedicated operating system may include at least one of, for example, QNX, Linux, Window, Genivi, Android, or iOS.

According to an embodiment, when a vehicle function using at least one of the main antenna 110 or a hardware device provided in the vehicle, which includes the input/output device 150, is provided, the head unit device 130 may operate in the foreground state. The vehicle function may include at least one of, for example, an embedded audio function (e.g., a CD player), a radio function, or an embedded navigation function.

According to an embodiment, before an infotainment service is requested after the head unit device 130 is powered on, the head unit device 130 may operate in the foreground state. When operating in the foreground state, the head unit device 130 may have priority (e.g., priority use right) to the main antenna 110 and a hardware device provided in the vehicle, which includes the input/output device 150.

According to an embodiment, when identifying that the infotainment service is requested via the input circuit 155, the head unit device 130 may instruct the infotainment device 140 to be powered on and may operate in a background state. For example, the head unit device 130 may switch from the background state to the foreground state depending on a user input (e.g., an instruction to stop the infotainment service) via the input circuit 155, while the infotainment service is provided by the infotainment device 140. For another example, when detecting a specified situation (e.g., an emergency situation) while operating in the background state (e.g., while providing the infotainment service), the head unit device 130 may instruct the infotainment device 140 to stop the infotainment service. The specified situation may include at least one of, for example, a vehicle accident situation or a vehicle rollover situation. The head unit device 130 may automatically switch to the foreground state in, for example, the specified situation and may make an emergency call using the main antenna 110.

According to an embodiment, the head unit device 130 may be connected with the infotainment device 140 via a specified interface (a first interface (IF)). The specified interface may include, for example, a USB interface.

According to an embodiment, the slot 120 may be installed in a room mirror, a side mirror, a dashboard, or a glove box of the vehicle to be combinable with the infotainment device 140. For example, the slot 120 may be disposed in at least one surface of the room mirror, the side mirror, or the dashboard. At least a part of the infotainment device 140 may be inserted into the slot 120 to be fixed to at least a part of one surface of the room mirror, the side mirror, or the dashboard. For another example, the slot 120 may be embedded in a housing of the room mirror, the side mirror, or the dashboard. At least a part of the infotainment device 140 may be inserted into the slot 120 to be installed or embedded in the housing of the room mirror, the side mirror, or the dashboard. For another example, the slot 120 may include at least one vehicle connector capable of being electrically connected with the infotainment device 140. The at least one vehicle connector may include at least one of, for example, a vehicle power line (a vehicle battery and the ground), an interface capable of being electrically connected with the head unit device 130, or an interface capable of being connected with the main antenna 110. Thus, when at least a part of the infotainment device 140 is inserted into the slot 120, the infotainment device 140 may be electrically connected with the vehicle power line, the head unit device 130, and the main antenna 110.

According to an embodiment, when powered on, the infotainment device 140 may provide an infotainment service. For example, when the head unit device 130 instructs the infotainment device 140 to be powered on according to a user input via the input circuit 155, the infotainment device 140 may be powered on. The infotainment service may include at least one of, for example, a navigation function, a music streaming function, a digital broadcast playback function, or web service communication.

The infotainment device 140 may operate using an operating system distinguished from (or independent of) the vehicle dedicated operating system, for example, an operating system for infotainment service. The operating system for infotainment service may include, for example, the Android operating system. At this time, the operating system for infotainment service may be the same operating system as the vehicle dedicated operating system or may be a different operating system from the vehicle dedicated operating system. The infotainment service may be driven according to execution of an application run on the operating system for infotainment service.

According to an embodiment, after being powered off, the infotainment device 140 may be powered on under the instruction of the head unit device 130 to provide the infotainment service. The infotainment device 140 may include at least one sub-antenna, may obtain a signal for an infotainment service using a multiple input multiple output (MIMO) antenna system including the main antenna 110 and the sub-antenna, and may instruct the head unit device 130 to output the obtained signal via at least one of the speaker 151 or the display 153.

According to an embodiment, when providing the infotainment service, the infotainment device 140 may operate in the foreground state. When operating in the foreground state, the infotainment device 140 may have priority (e.g., priority use right) to the main antenna 110 and a hardware device provided in the vehicle, which includes the input/output device 150. For example, while providing the infotainment service using the at least one input/output device 150, a navigation embedded in the vehicle may fail to use the at least one input/output device 150.

According to an embodiment, while providing the infotainment service, the infotainment device 140 may switch to the background state depending on a user input via the input circuit 155. The user input may include a specified function needing to stop the infotainment service, for example, a request to execute a hands-free function.

The infotainment device 140 may provide the infotainment service in the background state. For example, the infotainment device 140 may continue providing the infotainment service using a device which is not used between the main antenna 110 and the input/output device 150 by the head unit device 130 in the background state. When the head unit device 130 is using the main antenna 110, the infotainment device 140 may provide the infotainment service using the sub-antenna. When one display which is in use in the infotainment service among the plurality of displays 153 is used by the head unit device 130, the infotainment service 140 may provide the infotainment service on another display.

According to an embodiment, when obtaining a power-off instruction, the infotainment device 140 may be powered off. For example, when identifying a user input instructing to end the infotainment service via the input circuit 155, the infotainment device 140 may be powered off. In this case, the head unit device 130 may identify that the infotainment device 140 is powered off and may operate in the foreground state. For another example, when obtaining a power-off instruction from the head unit device 130 in the specified situation, the infotainment device 140 may be powered off.

According to an embodiment, the infotainment device 140 may interface with an external memory (e.g., a universal subscriber identity module (USIM), a secure digital (SD) card, or a USB memory) and may provide the infotainment service using data obtained from the external memory. For example, the infotainment device 140 may be composed to interface with the USIM, the SD card, or the USB memory to obtain data from the USIM, the SD card, or the USB memory and output the obtained data using at least one of the speaker 151 or the display 153.

According to the above-mentioned embodiment, the electronic system for vehicle constitutes the infotainment service 140 and the head unit device 130, which provide the infotainment service, as separate hardware and may constitute the infotainment device 140 to be detachable (replaceable), thus easily upgrading a vehicle infotainment service environment in a situation where an upgrade for the infotainment service is needed (e.g., in a situation where a network environment is upgraded).

Figure 2A:
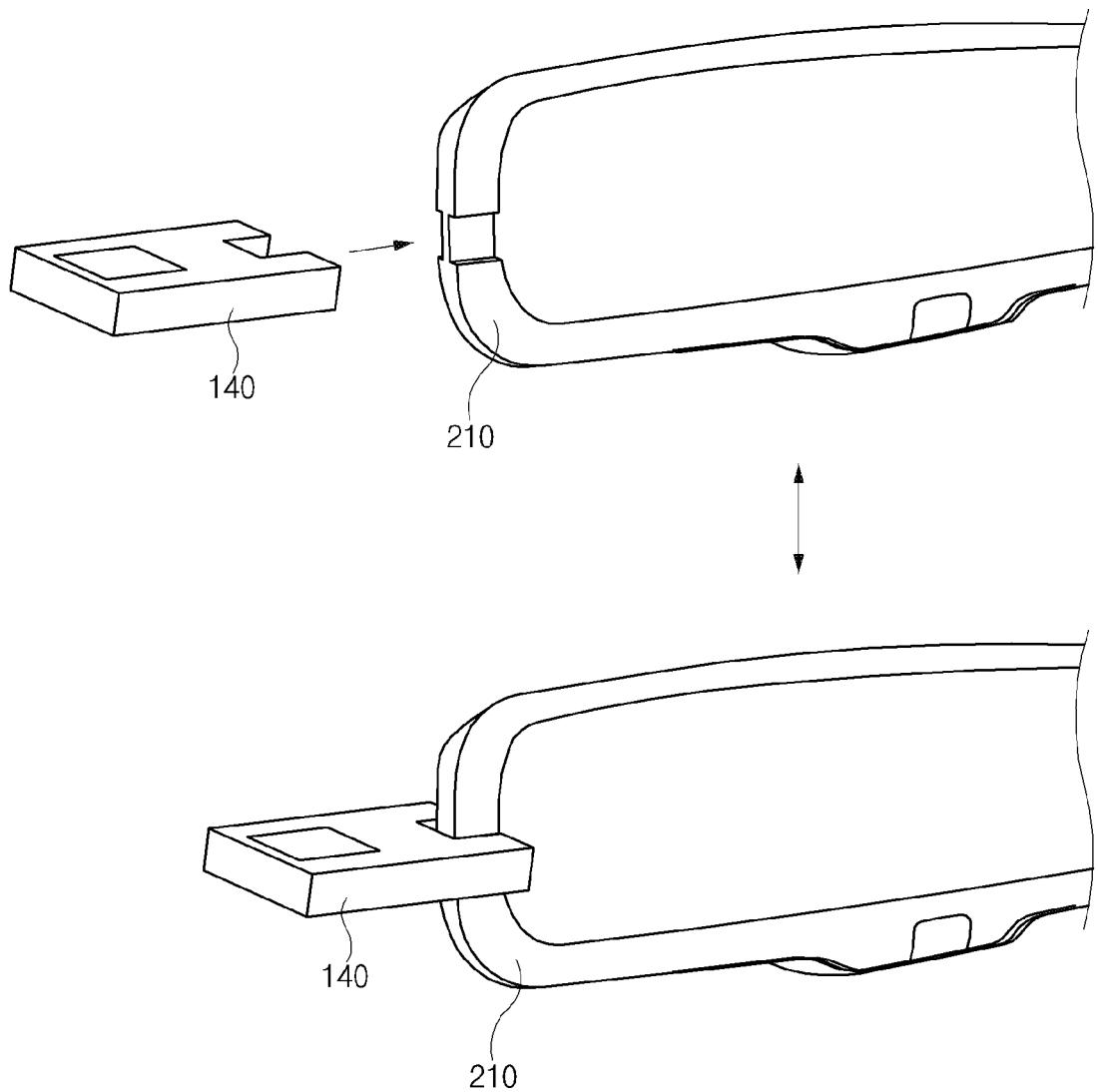
FIGS. 2A and 2B are drawings illustrating an infotainment device 140 mounted on a slot provided in a room mirror according to an embodiment.

FIG. 2A is a drawing illustrating an infotainment device 140 mounted on a slot (e.g., 120 of FIG. 1) provided at a side of a room mirror 210 according to an embodiment.

Referring to FIG. 2A, according to an embodiment, the slot 120 may be provided at a portion of a side surface of the room mirror 210, for example, a central region. A first connector combinable with an infotainment device (e.g., 140 of FIG. 1) may be provided on the slot 120, and a second connector combinable with the first connector may be provided on the infotainment device 140. The first connector may be, for example, a female connector, and the second connector connected with the first connector may be a male connector. When the first connector and the second connector are connected with each other, the infotainment device 140 may be electrically or operatively connected with a vehicle power line, a main antenna (e.g., 110 of FIG. 1), and a head unit device (e.g., 130 of FIG. 1). The first connector and the second connector may include a plurality of first connectors and a plurality of second connectors, respectively.

Figure 2B:
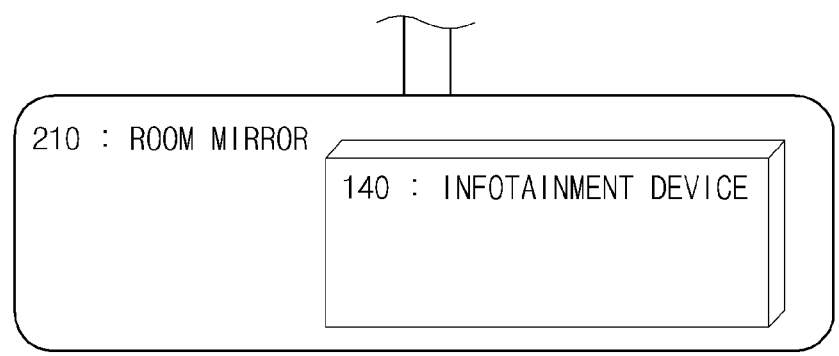

FIG. 2B is a drawing illustrating an infotainment device mounted on a slot provided in a rear surface of a room mirror 210 according to an embodiment.

Referring to FIG. 2B, according to an embodiment, a slot 120 may be provided at a portion of a rear surface of the room mirror 210, for example, a right region of the rear surface. A first connector combinable with an infotainment device (e.g., 140 of FIG. 1) may be provided on the slot 120, and a second connector combinable with the first connector may be provided on the infotainment device 140. The first connector may be, for example, a female connector, and the second connector connected with the first connector may be a male connector. When the first connector and the second connector are connected with each other, the infotainment device 140 may be electrically or operatively connected with a vehicle power line, a main antenna (e.g., 110 of FIG. 1), and a head unit device (e.g., 130 of FIG. 1). According to various embodiments, the slot 120 may be provided in the room mirror 210.

Hereinafter, a description will be given of an arrangement structure of an infotainment device (e.g., 140 of FIG. 1) and a connection structure between a main antenna and an antenna of the infotainment device according to an embodiment with reference to FIGS. 3A to 3C.

Figure 3A:
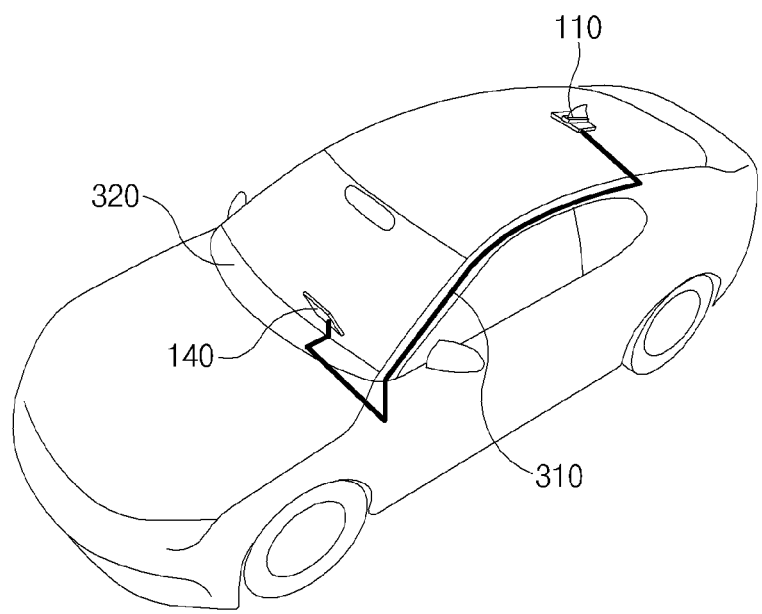
FIG. 3A illustrates a connection structure between an infotainment device disposed in a dashboard and a main antenna according to an embodiment.

FIG. 3A illustrates a connection structure between an infotainment device 140 disposed in a dashboard and a main antenna (e.g., 110 of FIG. 1) according to an embodiment.

Referring to FIG. 3A, according to an embodiment, the infotainment device 140 may be disposed in a dashboard 320 of a vehicle. For example, as the infotainment device 140 is coupled to a slot 120 provided in the dashboard 320, it may be disposed in the dashboard 320. In this case, a transmission line 310 may be formed along the outside of a car body to be connected to the slot 120 in the dashboard 320, thus connecting a main antenna 110 with a sub-antenna of the infotainment device 140.

Figure 3B:
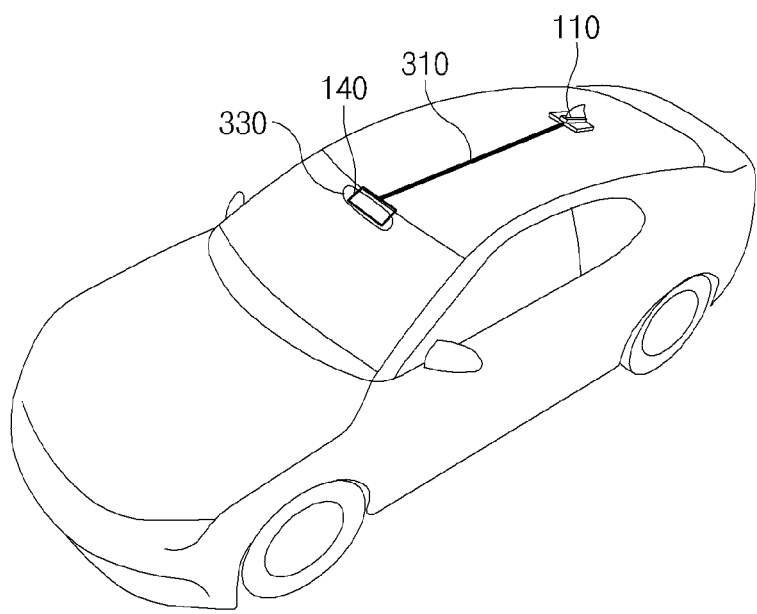
FIG. 3B illustrates a connection structure between an infotainment device disposed in a room mirror and a main antenna according to an embodiment.

FIG. 3B illustrates a connection structure between an infotainment device 140 disposed in a room mirror and a main antenna 110 according to an embodiment.

Referring to FIG. 3B, according to an embodiment, the infotainment device 140 may be disposed in a room mirror 330 of a vehicle. For example, as the infotainment device 140 is coupled to a slot 120 provided in the room mirror 330, it may be disposed in the room mirror 330. In this case, a transmission line 310 may be formed along the outside of a car body to connect a main antenna 110 with a sub-antenna of the infotainment device 140 through a portion where the room mirror 330 and the car body are connected to each other. According to FIG. 3B, because the transmission line 310 is formed outside the car body of a metal material, loss due to the transmission line 310 may be reduced.

Figure 3C:
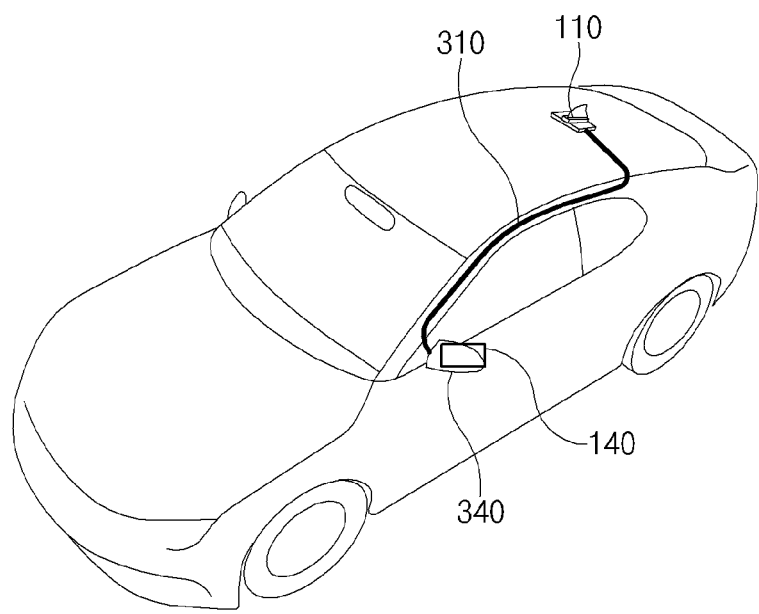
FIG. 3C illustrates a connection structure between an infotainment device disposed in a side mirror and a main antenna according to an embodiment.

FIG. 3C illustrates a connection structure between an infotainment device 140 disposed in a side mirror and a main antenna 110 according to an embodiment.

Referring to FIG. 3C, according to an embodiment, the infotainment device 140 may be disposed in a side mirror 340 of a vehicle. For example, as the infotainment device 140 is coupled to a slot 120 provided in the side mirror 340, it may be disposed in the side mirror 340. In this case, a transmission line 310 may be formed along the outside of a car body to connect a main antenna 110 with a sub-antenna of the infotainment device 140 through a portion where the side mirror 340 and the car body are connected to each other. According to FIG. 3C, because the transmission line 310 is formed outside the car body of a metal material, loss due to the transmission line 310 may be reduced.

Figure 3D:
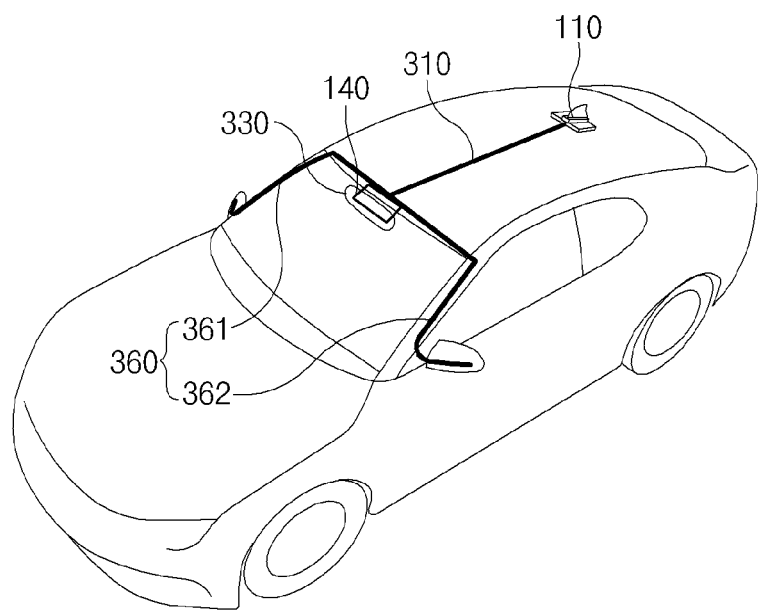
FIG. 3D illustrates a 4*4 antenna structure of an electronic device for vehicle, where sub-antennas are respectively disposed on a vehicle and an infotainment device, according to an embodiment.

FIG. 3D illustrates a 4*4 antenna structure of an electronic device for vehicle, where sub-antennas are respectively disposed on a vehicle and an infotainment device, according to an embodiment.

Referring to FIG. 3D, one sub-antenna may be provided in the infotainment device 140, and a first sub-antenna 361, a second sub-antenna 362, and one main antenna 110 may be provided in the vehicle. In this case, the first sub-antenna 361 and the second sub-antenna 362 may be connected to a transmission line 310, which connects the main antenna 110 with an infotainment device 140, in the form of a Y-shape. For example, the first sub-antenna 361 may be formed to be extended from the main antenna 110 to a right side mirror along a car body. The second sub-antenna 362 may be formed to be extended from the main antenna 110 to a left side mirror along the car body. In this case, when the infotainment device 150 is replaced with an infotainment device which further has five antennas, an electronic system for vehicle (e.g., FIG. 1) may be configured as an 8*8 MIMO system.

Figure 4:
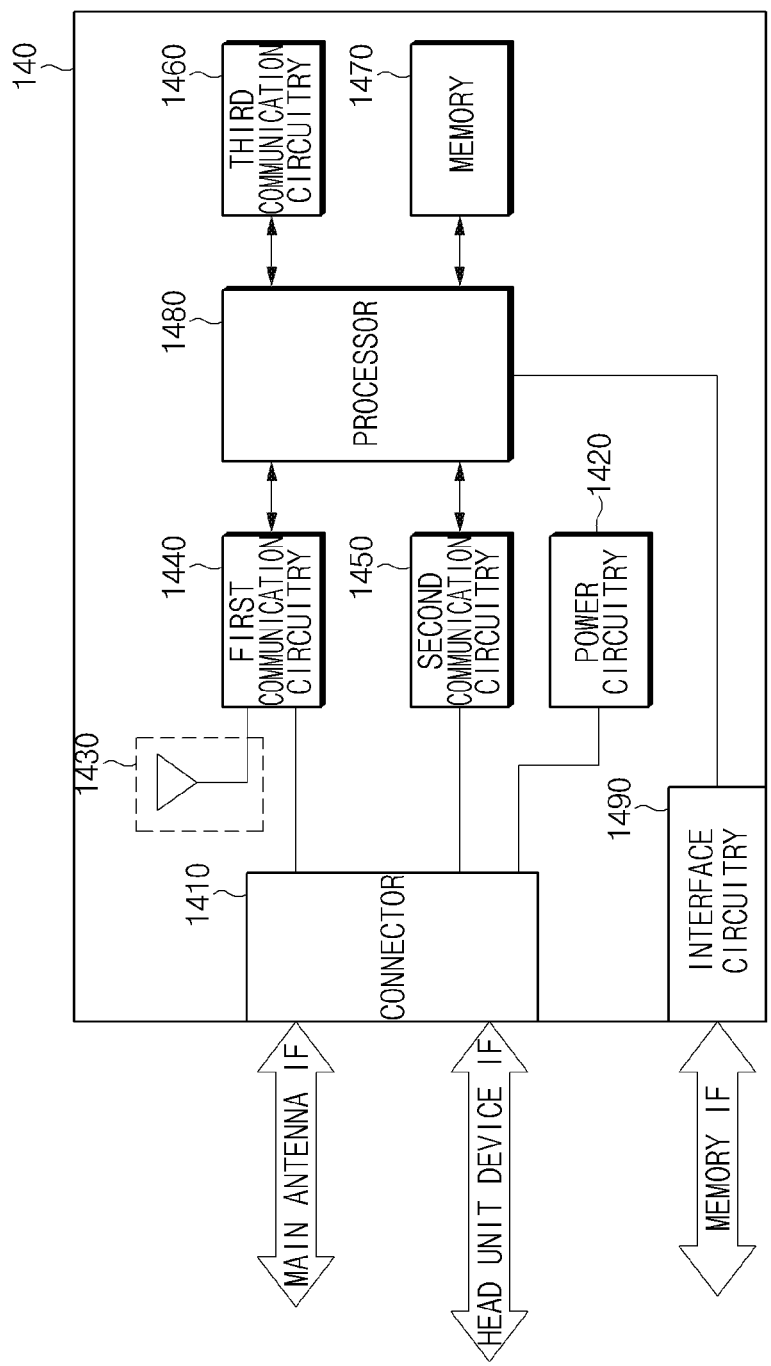
FIG. 4 is a drawing illustrating a configuration of an infotainment device according to an embodiment.

FIG. 4 is a drawing illustrating a configuration of an infotainment device according to an embodiment.

Referring to FIG. 4, according to an embodiment, an infotainment device 140 may include at least one connector 1410, a power circuitry 1420, at least one sub-antenna 1430, a first communication circuitry 1440, a second communication circuitry 1450, a third communication circuitry 1460, a memory 1470, and a processor 1480. In an embodiment, the infotainment device 140 may omit some components or may further include an additional component. For example, the infotainment device 140 may further include an interface circuitry 1490 capable of interfacing with an external memory. In an embodiment, some of the components of the infotainment device 140 may be combined to form one entity, and functions of the corresponding components before the combination may be performed in the same manner.

According to an embodiment, the at least one connector 1410 may be electrically connected with a vehicle power line, a main antenna 110, and a head unit device 130. The at least one connector 1410 may be detached from at least one other connector provided in a slot 120. For example, when the at least one connector 1410 is connected with the at least one other connector, the infotainment device 140 may be electrically connected with the vehicle power line, the main antenna 110, and the head unit device 130. According to various embodiments, a head unit device 130 and the infotainment device 140 may perform wireless communication.

According to an embodiment, when receiving a vehicle power via the at least one connector 1410, the power circuitry 1420 may supply a driving power to respective components (e.g., the first communication circuitry 1440, the second communication circuitry 1450, the third communication circuitry 1460 and the processor 1480) of the infotainment device 140. For example, the power circuitry 1420 may convert a level of the vehicle power to correspond to a driving power of each component and may supply the converted vehicle power to each component of the infotainment device 140. When obtaining a power-on instruction from the head unit device 130, the power circuitry 1420 may supply a driving power to each component of the infotainment device 140.

According to an embodiment, the at least one sub-antenna 1430 may be electrically connected with the main antenna 110 disposed outside the vehicle, via the at least one connector 1410 and another connector provided in the slot 120. The at least one sub-antenna 1430 may be combined with the main antenna 110 to be composed as a MIMO antenna system capable of covering a first frequency band for communication of a first specified scheme. The at least one sub-antenna 1430 may be matched to the first frequency band. The number of the at least one sub-antenna 1430 may correspond to the number of channels of the multiple input multiple output (MIMO) antenna system. For example, when the infotainment device 140 adopts a 4*4 MIMO antenna system, the at least one sub-antenna 1430 may include three antennas.

According to an embodiment, the first communication circuitry 1440 may perform the communication of the first specified scheme for an infotainment service using the main antenna 110 and the at least one sub-antenna 1430 under the instruction of the processor 1480. The first specified scheme may include communication, for example, 3G, LTE, or 5G. For example, the first communication circuitry 1440 may convert and output an infotainment service signal obtained in the first specified scheme into a format analyzable by the processor 1480, or may convert a signal (e.g., a signal applying for an infotainment service) obtained from the processor 1480 into a signal of the first specified scheme and may transmit the signal of the first specified scheme via the main antenna 110 and the at least one sub-antenna 1430.

According to an embodiment, the second communication circuitry 1450 may communicate with the head unit device 130 in a second specified scheme. The second specified scheme may include a serial communication scheme, for example, USB communication, recommended standard (RS)-232, I2C, RS-485, institute of electrical and electronics engineers (IEEE) 1394, musical instrument digital interface (MIDI), or peripheral component interconnect (PCI). For example, the second communication circuitry 1450 may convert and output a signal obtained in the second specified scheme into a format analyzable by the processor 1480, or may convert a signal (e.g., an output signal of the infotainment service) obtained from the processor 1480 into a signal of the second specified scheme and may transmit the signal of the second specified scheme via the at least one connector 1410. When obtaining the obtained output signal of the infotainment service, the head unit device 130 may output the output signal through at least one of a speaker 151 or a display 153.

According to an embodiment, the third communication circuitry 1460 may communicate with a user terminal in a third specified scheme. The third communication circuitry 1460 may be connected with an antenna for wireless communication of a third specified scheme. The third specified scheme may include a short-range communication scheme, for example, Bluetooth, WiFi, or Zigbee. For example, the third communication circuitry 1460 may convert and output a signal obtained from the user terminal in the third specified scheme into a format analyzable by the processor 1480, or may convert a signal obtained from the processor 1480 into a signal of the third specified scheme and may transmit the signal of the third specified scheme to the user terminal. According to various embodiments, the third communication circuitry 1460 may be omitted. Alternatively, the third communication circuitry 1460 may perform wireless communication with the head unit device 130. In this case, the second communication circuitry 1450 may be omitted.

According to an embodiment, the memory 1470 may be a volatile memory (e.g., a RAM), a non-volatile memory (e.g., a ROM or a flash memory), or a combination thereof. The memory 1470 may store, for example, a command or data associated with at least one other component of the infotainment device 140. For example, the memory 1470 may store instructions for power-on (booting) of the infotainment device 140. The memory 1470 may store instructions for an infotainment service by the infotainment device 140.

According to an embodiment, the processor 1480 may be operatively or electrically connected with the at least one connector 1410, the at least one sub-antenna 1430, the first communication circuitry 1440, the second communication circuitry 1450, the third communication circuitry 1460, and the interface unit 1480.

According to an embodiment, the processor 1480 may be configured to support at least one communication scheme among 2*2 multiple input multiple output (MIMO), 4*4 MIMO, 8*8 MIMO, 16*16 MIMO, or 32*32 MIMO based on the at least one sub-antenna 1430 and the main antenna 110.

According to an embodiment, when the infotainment service is requested through a user input via an input circuit 155, the processor 1480 may request the infotainment service from a specified server depending on the request. For example, when an app for infotainment service is run according to a user input and when a music streaming service is requested through the corresponding app, the processor 1480 may request the music streaming service from a music streaming server. The app may be an app capable of operating based on an operating system for infotainment service, for example, an app for Android.

According to an embodiment, the processor 148 may obtain a signal for an infotainment service using the first communication circuitry 1440 and may output the obtained signal using the speaker 151 or the display 153 operatively connected with the head unit device 130 via the second communication circuitry 1450. For example, when a navigation service through an app for infotainment service is requested, the processor 1480 may request route guidance information to a destination from a server which provides a navigation service and may obtain the route guidance information in response to the request to output the route guidance information through the display 153 and the speaker 151.

According to an embodiment, the processor 1480 may operate independently of the head unit device 130. For example, the processor 1480 may operate based on an operating system for infotainment service distinguished from the head unit device 130. The processor 1480 may operate in a foreground state, when providing the infotainment service. For example, the processor 1480 may have priority to the main antenna 110, the input circuit 155, a speaker 151, and the display 153 when providing the infotainment service.

According to an embodiment, the processor 1480 may stop the infotainment service under the instruction of the head unit device 130 in a specified situation (e.g., an emergency situation). The specified situation may include for example, a vehicle rollover situation or a vehicle accident situation.

According to an embodiment, the processor 1480 may communicate with the user terminal in the third specified scheme using the third communication circuitry 1460. For example, the processor 1480 may obtain music stored in the user terminal in the third specified scheme and may output the obtained music via the speaker 151. For another example, after being Bluetooth paired with the user terminal, when a handsfree service is requested from the user terminal, the processor 1480 may obtain a call signal from the user terminal and may output the obtained signal via the speaker 151.

According to an embodiment, the infotainment device 140 may interface with an external memory (e.g., a USIM, an SD card, or a USB memory). For example, the interface unit 1480 may include an interface of the USIM, the SD card, or the USB memory, and the processor 1480 may obtain data from the USIM, the SD card, or the USB memory, which is coupled to the interface unit 1480. The processor 1480 may output the obtained data using at least one of the speaker 151 or the display 153.

According to an embodiment, because the infotainment device 140 is composed as a device independent of the head unit device 130 of the vehicle and is composed to be replaceable, it may improve a network speed by easily upgrading a vehicle network environment in a situation needing a network upgrade of the vehicle (e.g., a situation where the network environment is upgraded).

Figure 5:
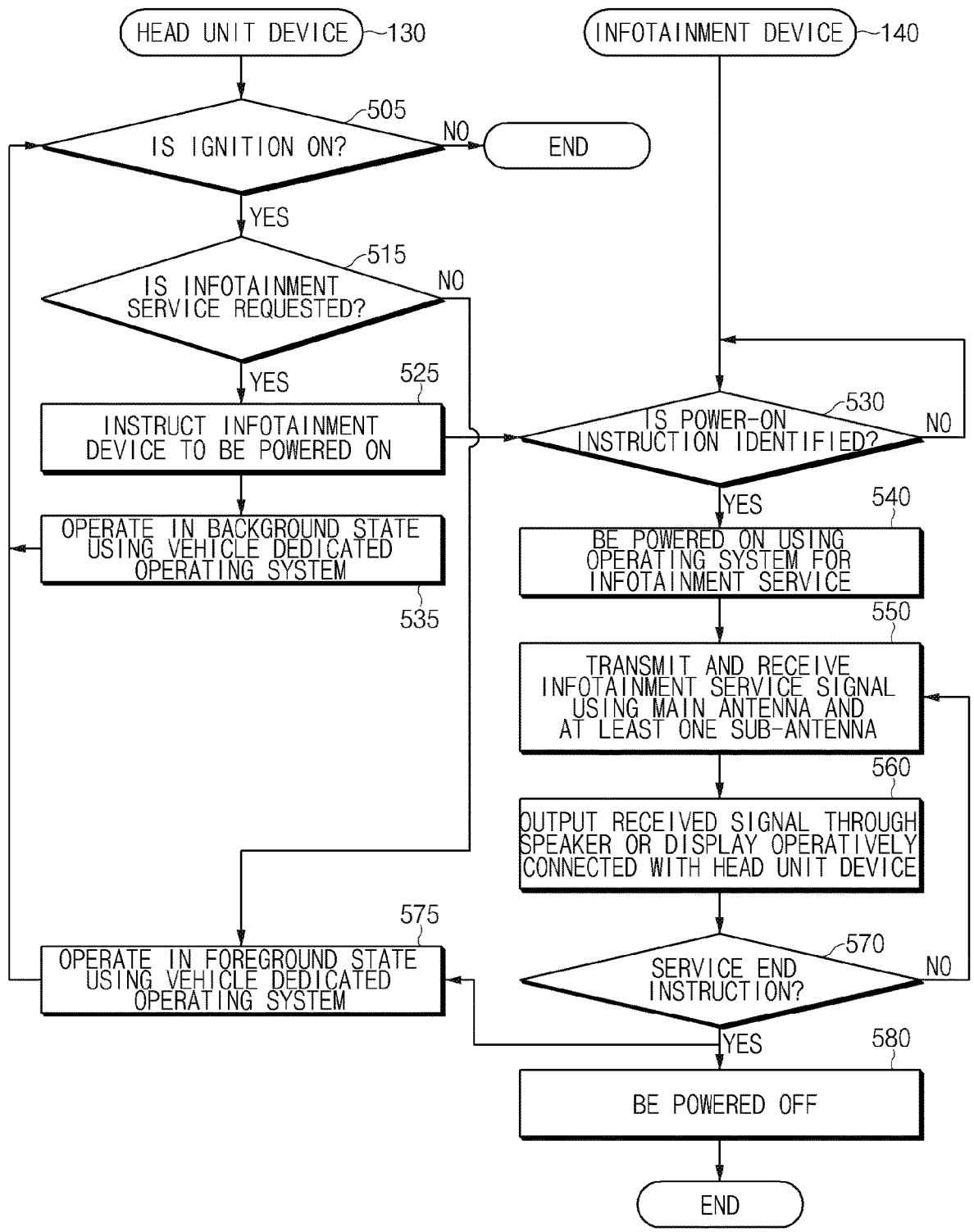
FIG. 5 illustrates a flowchart of an operation method of an electronic system for vehicle according to an embodiment.

FIG. 5 illustrates a flowchart of an operation method of an electronic system for vehicle according to an embodiment.

Referring to FIG. 5, in operation 505, when the ignition is on, a head unit device (e.g., a head unit device 130 of FIG. 1) may be powered on. In operation 505, when the ACC is powered on although the ignition is not on, the head unit device 130 may be powered on. When powered on, the head unit device 130 may provide vehicle state information or a portion of an infotainment service while operating in a foreground state using a vehicle dedicated operating system. For example, the head unit device 130 may output vehicle state information on a display (e.g., a display 153 of FIG. 1) of a dashboard. For another example, the head unit device 130 may provide a navigation function through an embedded navigation installed in the vehicle. When operating in the foreground state, the head unit device 130 may have priority to a main antenna 110 and vehicle hardware including an input/output device 150.

When a user input requesting an infotainment service is identified via an input circuit 155 in operation 515, in operation 525, the head unit device 130 may instruct the infotainment device 140 to be booted (e.g., enabled) or powered on. In operation 535, after instructing the infotainment device 140 to be powered on (or after the infotainment device 140 is powered on), the head unit device 130 may operate in a background state.

When obtaining the power-on instruction from the head unit device 130 in operation 530, in operation 540, the infotainment device 140 may be powered on to boot an operating system for infotainment service. When powered on, the infotainment device 140 may operate in the foreground state. In operation 550, the infotainment device 140 may transmit and receive a signal for the infotainment service using the main antenna 110 and at least one sub-antenna 1430. When operating in the foreground state, the infotainment device 140 may take over priority to the main antenna 110 and hardware necessary for the infotainment service among vehicle hardware including the input/output device 150 from the head unit device 130.

In operation 560, the infotainment device 140 may output the obtained signal through a speaker 151 or the display 153, which is operatively connected with the head unit device 130.

When identifying a user input instructing to end the service via the input circuit 155 in operation 570, in operation 580, the infotainment device 140 may be powered off. In operation 560, the electronic device 140 may obtain a service end instruction from the head unit device 130 in a specified situation (e.g., a vehicle accident situation) and may be powered off or may be driven in the background state.

When not providing the infotainment service, in operation 575, the head unit device 130 may operate in the foreground state using a vehicle dedicated operating system.

According to the above-mentioned embodiment, as the infotainment device 140 and the head unit device 130 operates using different operating systems, the infotainment device 140 may provide the infotainment service without having a great influence on a vehicle system (e.g., an operation of the vehicle dedicated operating system).

Figure 6:
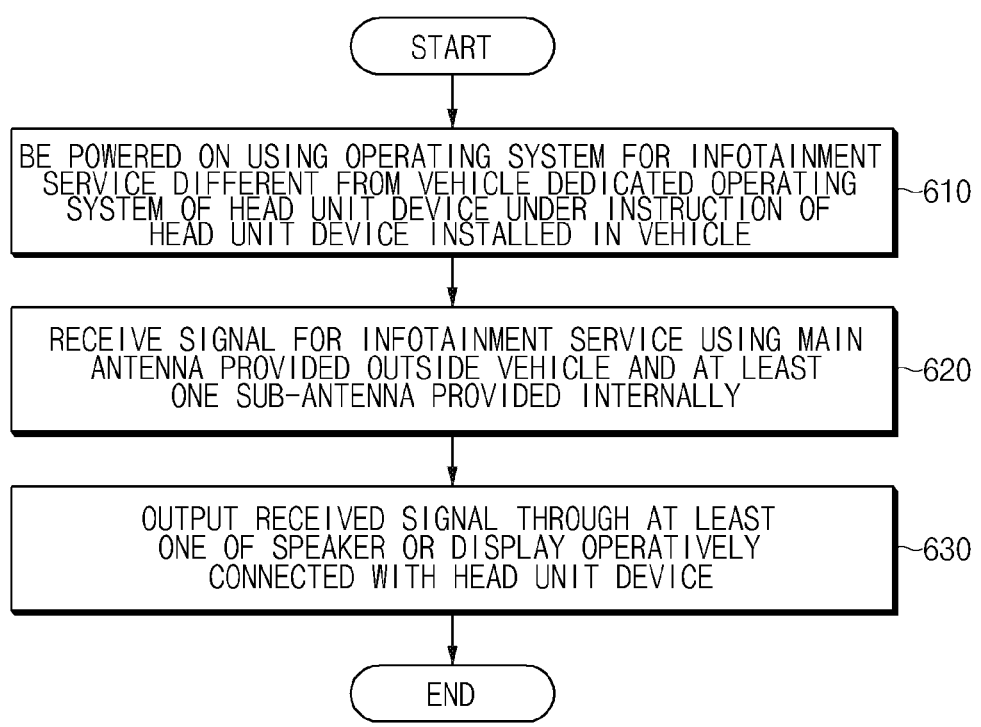
FIG. 6 illustrates a method for providing an infotainment service according to an embodiment.

FIG. 6 illustrates a method for providing an infotainment service according to an embodiment.

Referring to FIG. 6, in operation 610, an infotainment device 140 may be powered on using an operating system for infotainment service, which is distinguished from a vehicle dedicated operating system of a head unit device 130, under the instruction of the head unit device 130 installed in a vehicle.

In operation 620, the infotainment device 140 may obtain a signal for an infotainment service using a main antenna provided outside the vehicle and at least one sub-antenna provided internally.

In operation 630, the infotainment device 140 may output the obtained signal through at least one of a speaker or a display, which is operatively connected with the head unit device 130.

According to an embodiment, an infotainment device (e.g., 140 of FIG. 1) may include a connector (e.g., 1410 of FIG. 4) detachable from a slot (e.g., 120 of FIG. 1) disposed in a vehicle; at least one sub-antenna (e.g., 1430 of FIG. 4) electrically connected with a main antenna (e.g., 110 of FIG. 1) disposed outside the vehicle; a first communication circuitry (e.g., 1440 of FIG. 4) configured to perform communication for an infotainment service using the main antenna and the at least one sub-antenna; a second communication circuitry (e.g., 1450 of FIG. 4) configured to communicate with a head unit device installed in the vehicle; and a processor (e.g., 1480 of FIG. 4) operatively connected with the connector, the at least one sub-antenna, the first communication circuitry, and the second communication circuitry. The processor may be configured to obtain a signal for the infotainment service using the first communication circuitry and output the obtained signal using a speaker or a display operatively connected to the head unit device via the second communication circuitry.

The processor may take over priority to a main antenna provided outside the vehicle and a hardware device provided in the vehicle, the hardware device including the speaker and the display.

The processor may be configured to operate based on an operating system for infotainment service, and the operating system for infotainment service may be distinguished from the head unit device being driven based on a vehicle dedicated operating system.

The processor may be configured to receive a vehicle power through the connector and be powered on to be driven in a foreground state when receiving a power-on instruction from the head unit device.

The slot may be disposed in a side mirror, a room mirror, or a dashboard of the vehicle. The sub-antenna may be connected with the main antenna through a portion where the side mirror, the room mirror, or the dashboard is connected with a car body.

According to an embodiment, the infotainment device (e.g., 140 of FIG. 1) may further include a third communication circuitry (e.g., 1460 of FIG. 4) configured to perform wireless communication. The processor may be configured to obtain a signal from a user terminal using the third communication circuitry and deliver the obtained signal to the head unit device using the second communication circuitry.

The processor may be configured to be driven in a background state, when in a specified situation while providing the infotainment service.

The processor may be configured to support at least one communication scheme among 2*2 multiple input multiple output (MIMO), 4*4 MIMO, 8*8 MIMO, 16*16 MIMO, or 32*32 MIMO, based on the at least one sub-antenna and the main antenna.

According to an embodiment, a method for providing an infotainment service in an infotainment device may include being powered on using an operating system for infotainment service under an instruction of a head unit device installed in a vehicle; obtaining a signal for an infotainment service using a main antenna provided outside the vehicle and at least one sub-antenna provided internally; and outputting the obtained signal through at least one of a speaker or a display operatively connected to the head unit device.

According to an embodiment, an electronic system for vehicle (e.g., FIG. 1) may include a slot (e.g., 120 of FIG. 1) disposed in a vehicle; a main antenna (e.g., 110 of FIG. 3A) disposed outside the vehicle; and at least one sub-antenna (e.g., 1430 of FIG. 4). The electronic system may further include an infotainment device (e.g., 140 of FIG. 1) configured to be detachable from the slot and a head unit device (e.g., 130 of FIG. 1) operatively connected with at least one of a display or a speaker. The infotainment device may be configured to obtain a signal for an infotainment service using the main antenna and the at least one sub-antenna and instruct the head unit device to output the obtained signal through at least one of the display or the speaker.

The slot may be formed in at least a portion of a room mirror of the vehicle. The at least one sub-antenna may be configured to be connected with the main antenna through a portion where the room mirror is connected with a car body.

The slot may be formed in at least a portion of a side mirror of the vehicle. The at least one sub-antenna may be configured to be connected with the main antenna through a portion where the side mirror is connected with a car body.

The slot may be formed in at least a portion of a dashboard of the vehicle. The at least one sub-antenna may be configured to be connected with the main antenna through a portion where the side mirror is connected with a car body.

According to an embodiment, the electronic system for vehicle may further include a transmission line (310 of FIG. 3A) formed in an upper surface, a side surface, or a lower surface of the car body to connect between the main antenna and the at least one sub-antenna.

The head unit device may be configured to operate based on a vehicle dedicated operating system, and the infotainment device may be configured to operate based on an operating system for infotainment service.

The vehicle dedicated operating system may include at least one of QNX, Linux, Window, Genivi, or Android, and the operating system for infotainment service may include Android.

According to an embodiment, the electronic system for vehicle (e.g., FIG. 1) may further include an input circuit (e.g., 155 of FIG. 1) operatively connected with the head unit device. The head unit device may be configured to instruct the infotainment device to be powered on, when a specified input is identified via the input circuit. The infotainment device may be configured to be powered on under the instruction of the head unit device.

When a service for vehicle using at least one of the main antenna or hardware provided in the vehicle is provided, the head unit device may be configured to be driven in a foreground state and the infotainment device may be powered off or be driven in a background state.

When the infotainment service is provided, the infotainment device may be configured to be driven in a foreground state, and the head unit device may be configured to be driven in a background state.

The infotainment device may be configured to be driven in a background state, when in a specified situation while providing the infotainment service.

Figure 7:
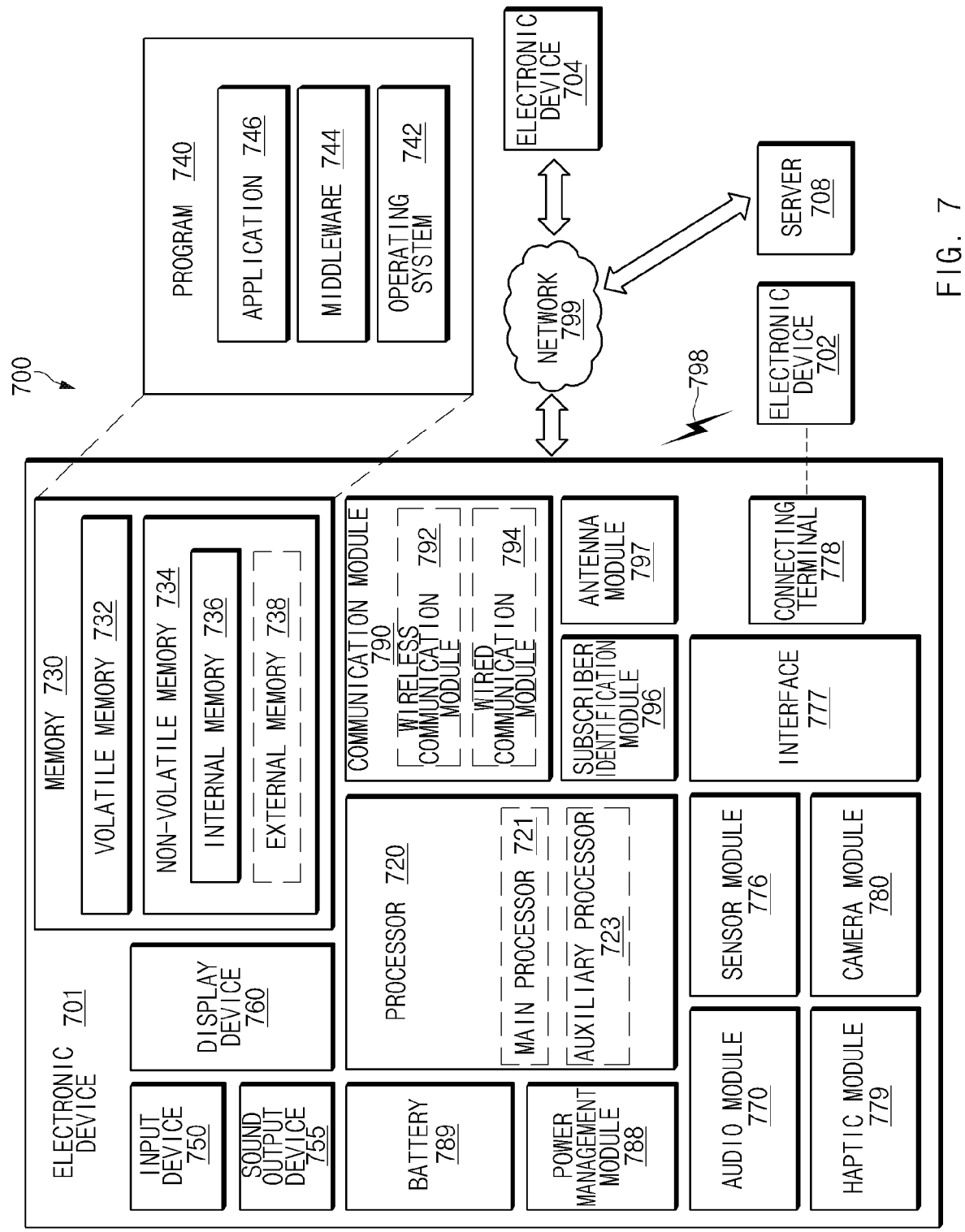
FIG. 7 is a block diagram illustrating an electronic device for providing an infotainment service in a network environment according to various embodiments.

FIG. 7 is a block diagram of an electronic device 701 for providing an infotainment service in a network environment 700 according to various embodiments. Referring to FIG. 7, the electronic device 701 in the network environment 700 may communicate with an electronic device 702 via a first network 798 (e.g., a short-range wireless communication network), or an electronic device 704 or a server 708 via a second network 799 (e.g., a long-range wireless communication network). According to an embodiment, the electronic device 701 may communicate with the electronic device 704 via the server 708. According to an embodiment, the electronic device 701 may include a processor 720, memory 730, an input device 750, a sound output device 755, a display device 760, an audio module 770, a sensor module 776, an interface 777, a haptic module 779, a camera module 780, a power management module 788, a battery 789, a communication module 790, a subscriber identification module (SIM) 796, or an antenna module 797. In some embodiments, at least one (e.g., the display device 760 or the camera module 780) of the components may be omitted from the electronic device 701, or one or more other components may be added in the electronic device 701. In some embodiments, some of the components may be implemented as single integrated circuitry. For example, the sensor module 776 (e.g., a fingerprint sensor, an iris sensor, or an illuminance sensor) may be implemented as embedded in the display device 760 (e.g., a display).

The processor 720 may execute, for example, software (e.g., a program 740) to control at least one other component (e.g., a hardware or software component) of the electronic device 701 coupled with the processor 720, and may perform various data processing or computation. According to one embodiment, as at least part of the data processing or computation, the processor 720 may load a command or data received from another component (e.g., the sensor module 776 or the communication module 790) in volatile memory 732, process the command or the data stored in the volatile memory 732, and store resulting data in non-volatile memory 734. According to an embodiment, the processor 720 may include a main processor 721 (e.g., a central processing unit (CPU) or an application processor (AP)), and an auxiliary processor 723 (e.g., a graphics processing unit (GPU), an image signal processor (ISP), a sensor hub processor, or a communication processor (CP)) that is operable independently from, or in conjunction with, the main processor 721. Additionally or alternatively, the auxiliary processor 723 may be adapted to consume less power than the main processor 721, or to be specific to a specified function. The auxiliary processor 723 may be implemented as separate from, or as part of the main processor 721.

The auxiliary processor 723 may control at least some of functions or states related to at least one component (e.g., the display device 760, the sensor module 776, or the communication module 790) among the components of the electronic device 701, instead of the main processor 721 while the main processor 721 is in an inactive (e.g., sleep) state, or together with the main processor 721 while the main processor 721 is in an active state (e.g., executing an application). According to an embodiment, the auxiliary processor 723 (e.g., an image signal processor or a communication processor) may be implemented as part of another component (e.g., the camera module 780 or the communication module 790) functionally related to the auxiliary processor 723.

The memory 730 may store various data used by at least one component (e.g., the processor 720 or the sensor module 776) of the electronic device 701. The various data may include, for example, software (e.g., the program 740) and input data or output data for a command related thereto. The memory 730 may include the volatile memory 732 or the non-volatile memory 734.

The program 740 may be stored in the memory 730 as software, and may include, for example, an operating system (OS) 742, middleware 744, or an application 746.

The input device 750 may receive a command or data to be used by other component (e.g., the processor 720) of the electronic device 701, from the outside (e.g., a user) of the electronic device 701. The input device 750 may include, for example, a microphone, a mouse, or a keyboard.

The sound output device 755 may output sound signals to the outside of the electronic device 701. The sound output device 755 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 760 may visually provide information to the outside (e.g., a user) of the electronic device 701. The display device 760 may include, for example, a display, a hologram device, or a projector and control circuitry to control a corresponding one of the display, hologram device, and projector. According to an embodiment, the display device 760 may include touch circuitry adapted to detect a touch, or sensor circuitry (e.g., a pressure sensor) adapted to measure the intensity of force incurred by the touch.

The audio module 770 may convert a sound into an electrical signal and vice versa. According to an embodiment, the audio module 770 may obtain the sound via the input device 750, or output the sound via the sound output device 755 or a headphone of an external electronic device (e.g., an electronic device 702) directly (e.g., wiredly) or wirelessly coupled with the electronic device 701.

The sensor module 776 may detect an operational state (e.g., power or temperature) of the electronic device 701 or an environmental state (e.g., a state of a user) external to the electronic device 701, and then generate an electrical signal or data value corresponding to the detected state. According to an embodiment, the sensor module 776 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 777 may support one or more specified protocols to be used for the electronic device 701 to be coupled with the external electronic device (e.g., the electronic device 702) directly (e.g., wiredly) or wirelessly. According to an embodiment, the interface 777 may include, for example, a high definition multimedia interface (HDMI), a universal serial bus (USB) interface, a secure digital (SD) card interface, or an audio interface.

A connecting terminal 778 may include a connector via which the electronic device 701 may be physically connected with the external electronic device (e.g., the electronic device 702). According to an embodiment, the connecting terminal 778 may include, for example, a HDMI connector, a USB connector, a SD card connector, or an audio connector (e.g., a headphone connector), The haptic module 779 may convert an electrical signal into a mechanical stimulus (e.g., a vibration or a movement) or electrical stimulus which may be recognized by a user via his tactile sensation or kinesthetic sensation. According to an embodiment, the haptic module 779 may include, for example, a motor, a piezoelectric element, or an electric stimulator.

The camera module 780 may capture a still image or moving images. According to an embodiment, the camera module 780 may include one or more lenses, image sensors, image signal processors, or flashes.

The power management module 788 may manage power supplied to the electronic device 701. According to one embodiment, the power management module 788 may be implemented as at least part of, for example, a power management integrated circuit (PMIC).

The battery 789 may supply power to at least one component of the electronic device 701. According to an embodiment, the battery 789 may include, for example, a primary cell which is not rechargeable, a secondary cell which is rechargeable, or a fuel cell.

The communication module 790 may support establishing a direct (e.g., wired) communication channel or a wireless communication channel between the electronic device 701 and the external electronic device (e.g., the electronic device 702, the electronic device 704, or the server 708) and performing communication via the established communication channel. The communication module 790 may include one or more communication processors that are operable independently from the processor 720 (e.g., the application processor (AP)) and supports a direct (e.g., wired) communication or a wireless communication. According to an embodiment, the communication module 790 may include a wireless communication module 792 (e.g., a cellular communication module, a short-range wireless communication module, or a global navigation satellite system (GNSS) communication module) or a wired communication module 794 (e.g., a local area network (LAN) communication module or a power line communication (PLC) module). A corresponding one of these communication modules may communicate with the external electronic device via the first network 798 (e.g., a short-range communication network, such as Bluetooth™, wireless-fidelity (Wi-Fi) direct, or infrared data association (IrDA)) or the second network 799 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 792 may identify and authenticate the electronic device 701 in a communication network, such as the first network 798 or the second network 799, using subscriber information (e.g., international mobile subscriber identity (IMSI)) stored in the subscriber identification module 796.

The antenna module 797 may transmit or receive a signal or power to or from the outside (e.g., the external electronic device) of the electronic device 701. According to an embodiment, the antenna module 797 may include one or more antennas, and, therefrom, at least one antenna appropriate for a communication scheme used in the communication network, such as the first network 798 or the second network 799, may be selected, for example, by the communication module 790 (e.g., the wireless communication module 792). The signal or the power may then be transmitted or received between the communication module 790 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 701 and the external electronic device 704 via the server 708 coupled with the second network 799. Each of the electronic devices 702 and 704 may be a device of a same type as, or a different type, from the electronic device 701. According to an embodiment, all or some of operations to be executed at the electronic device 701 may be executed at one or more of the external electronic devices 702, 704, or 708. For example, if the electronic device 701 should perform a function or a service automatically, or in response to a request from a user or another device, the electronic device 701, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 701. The electronic device 701 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 740) including one or more instructions that are stored in a storage medium (e.g., internal memory 736 or external memory 738) that is readable by a machine (e.g., the electronic device 701). For example, a processor (e.g., the processor 720) of the machine (e.g., the electronic device 701) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server. According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An infotainment device, comprising:
a connector detachable from a slot disposed in a vehicle, the vehicle is configured to obtain a signal associated with a specific service using a main antenna disposed in the vehicle in a state where the connector is detached to the slot;
at least one sub-antenna electrically connected with the main antenna disposed in the vehicle based on the connector that is attached to the slot;
a first communication circuitry configured to perform communication for an infotainment service using the main antenna and the at least one sub-antenna;
a second communication circuitry configured to communicate with a head unit device installed in the vehicle; and
a processor operatively connected with the connector, the at least one sub-antenna, the first communication circuitry, and the second communication circuitry,
wherein the processor is configured, in a state where the connector is attached to the slot disposed in the vehicle, to:

obtain a signal for the infotainment service using the first communication circuitry; and
output the obtained signal using a speaker or a display operatively connected to the head unit device via the second communication circuitry.

2. The infotainment device of claim 1, wherein the processor is further configured to take over priority to the main antenna provided in the vehicle and a hardware device provided in the vehicle from the head unit device, the hardware device including the speaker and the display.

3. The infotainment device of claim 1, wherein the processor is further configured to operate based on an operating system for infotainment service, and
wherein the operating system for infotainment service is distinguished from operating system of the head unit device, the head unit device being driven based on a vehicle dedicated operating system.

4. The infotainment device of claim 1, wherein the processor is further configured to:
receive a vehicle power through the connector, and
be powered on to be driven in a foreground state when obtaining a power-on instruction from the head unit device.

5. The infotainment device of claim 1, wherein the slot is disposed in a side mirror, a room mirror, or a dashboard of the vehicle, and
wherein the sub-antenna is connected with the main antenna through a part where the side mirror, the room mirror, or the dashboard is connected with a car body.

6. The infotainment device of claim 1, further comprising:
a third communication circuitry configured to perform wireless communication,
wherein the processor is further configured to:
obtain a signal from a user terminal using the third communication circuitry; and
deliver the obtained signal to the head unit device using the second communication circuitry.

7. The infotainment device of claim 1, wherein the processor is further configured to be driven in a background state, when in a specified situation while providing the infotainment service.

8. The infotainment device of claim 1, wherein the first communication circuitry is configured to perform communication for the infotainment service using a multiple input multiple output (MIMO) antenna system including the main antenna and the at least one sub-antenna, and
wherein a number of the at least one sub-antenna is corresponded to a number of channels of the MIMO antenna system.

9. A method for providing an infotainment service in an infotainment device, the method, comprising:
being powered on using an operating system for the infotainment service under an instruction of a head unit device installed in a vehicle, the vehicle is configured to obtain a signal associated with a specific service using a main antenna disposed in the vehicle, in a state where a connector of the infotainment device is detached to a slot of the vehicle;
in a state where the connector of the infotainment device is attached to the slot of the vehicle, obtaining a signal for the infotainment service using the main antenna provided in the vehicle and at least one sub-antenna provided internally; and
outputting the obtained signal through at least one of a speaker or a display operatively connected to the head unit device.

10. An electronic system for vehicle, the electronic system comprising:
a slot disposed in a vehicle;
a main antenna disposed in the vehicle;
at least one sub-antenna,
an infotainment device configured to be detachable from the slot; and
a head unit device operatively connected with at least one of a display or a speaker,
wherein the vehicle is configured to obtain a signal associated with a specific service using the main antenna, in a state where the infotainment device is detached to the slot, and
wherein the infotainment device is configured, in a state where the infotainment device is attached to the slot, to:
obtain a signal for an infotainment service using the main antenna and the at least one sub-antenna; and
instruct the head unit device to output the obtained signal through at least one of the display or the speaker.

11. The electronic system of claim 10, wherein the head unit device is configured to operate based on a vehicle dedicated operating system, and
wherein the infotainment device is further configured to operate based on an operating system for infotainment service.

12. The electronic system of claim 10, wherein a vehicle dedicated operating system includes at least one of QNX, Linux, Window, Genivi, or Android, and
wherein an operating system for infotainment service includes Android.

13. The electronic system of claim 10, further comprising:
an input circuit operatively connected with the head unit device,
wherein the head unit device is configured to:
instruct the infotainment device to be powered on, when a specified input is identified via the input circuit, and
wherein the infotainment device is further configured to be powered on under instruction of the head unit device.

14. The electronic system of claim 10, wherein, when a service for the vehicle using at least one of the main antenna or hardware provided in the vehicle is provided, the head unit device is configured to be driven in a foreground state and the infotainment device is further configured to be powered off or be driven in a background state.

15. The electronic system of claim 10, wherein, when the infotainment service is provided, the infotainment device is further configured to be driven in a foreground state and the head unit device is configured to be driven in a background state.

* * * * *